No. 820,321. PATENTED MAY 8, 1906.
C. C. SIBLEY & G. A. LUTZ.
OUTLET OR JUNCTION BOX.
APPLICATION FILED DEC. 21, 1903.
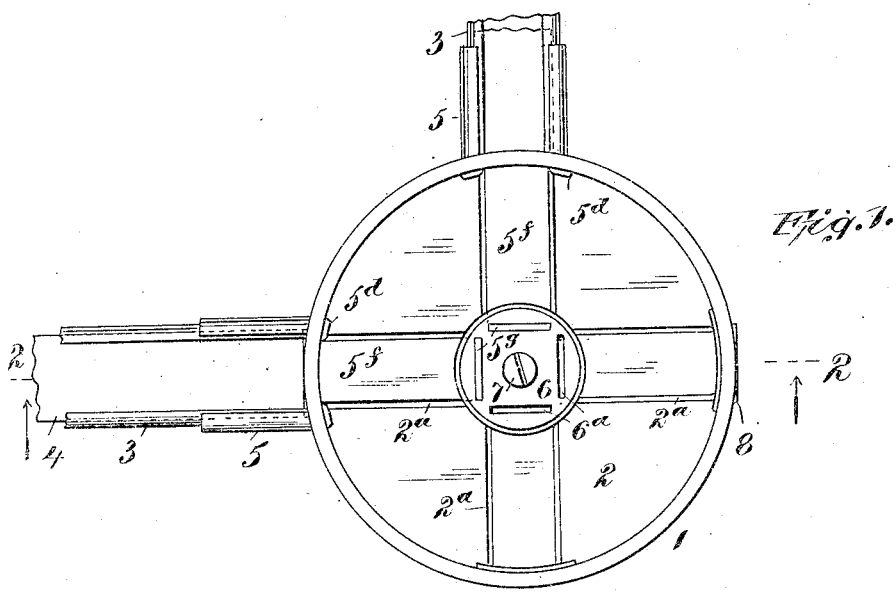
Fig. 1.
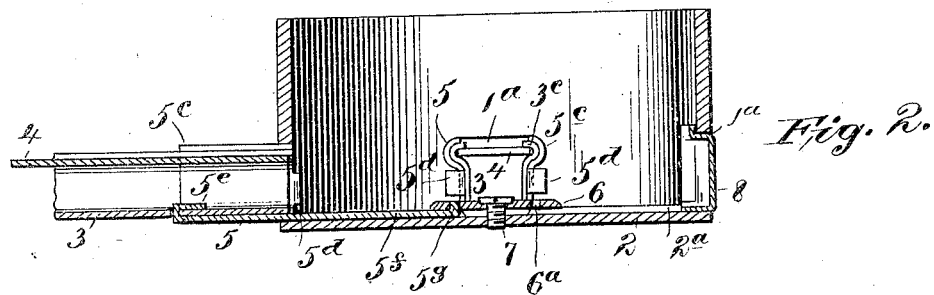
Fig. 2.
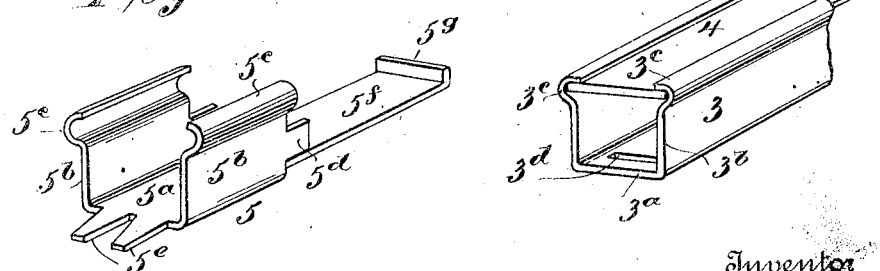
Fig. 3.   Fig. 4.
Witnesses
C. W. Benjamin
M. Hollingshead
Inventors
C. C. Sibley and G. A. Lutz
By their Attorney
F. F. Bourne

UNITED STATES PATENT OFFICE.

CLARENCE C. SIBLEY, OF PERTH AMBOY, NEW JERSEY, AND GEORGE A. LUTZ, OF NEW YORK, N. Y.

OUTLET OR JUNCTION BOX.

No. 820,321.                    Specification of Letters Patent.                    Patented May 8, 1906.

Application filed December 21, 1903. Serial No. 185,980.

*To all whom it may concern:*

Be it known that we, CLARENCE C. SIBLEY, a resident of Perth Amboy, Middlesex county, New Jersey, and GEORGE A. LUTZ, a resident of New York city, borough of Brooklyn, New York, citizens of the United States, have invented certain new and useful Improvements in Outlet or Junction Boxes, of which the following is a specification.

Our invention relates to improvements in outlet or junction boxes for use in electrical circuits, and is particularly adapted for use in connection with the class of conduits for electrical conductors shown in United States Patent No. 667,567, issued to E. D. Page on February 5, 1901.

The invention comprises a box or casing provided with holes for the passage of electrical conductors, channel-like members adapted to aline with such holes and receive the end portions of the conduits in the nature of a bond, and means for securing said members to the box, whereby the conduits may be connected by said members to the box, and by preference means are provided for detachably connecting said members with the box, so that the number of such members used with a box may correspond to the number of conduits to be connected with the box. Means are also provided for firmly connecting the conduits with such members to prevent relative movement of the parts with respect to each other.

The invention also comprises the novel details of improvement that will be more fully hereinafter set forth and then pointed out in the claims.

Reference is to be had to the accompanying drawings, forming part hereof, wherein—

Figure 1 is a plan view of an outlet or junction box embodying our invention. Fig. 2 is a section on the line 2 2 in Fig. 1 looking in the direction of the arrows. Fig. 3 is a perspective view of one of the members for connecting the conduits with the box, and Fig. 4 is a perspective view of a portion of a conduit.

Similar numerals of reference indicate corresponding parts in the several views.

The numeral 1 in the drawings indicates an outlet or junction box which may generally be made in any suitable form and material, being shown as circular and provided with a bottom 2 and an open end which may be closed by a cover in any well-known manner. At $1^a$ the box 1 is provided with holes for the passage of electrical conductors or wires, and at 3 is indicated a conduit shown generally of the class illustrated in said Patent No. 667,567, which comprises a bottom $3^a$ and sides $3^b$, provided with opposed grooved portions $3^c$, receiving a cover 4.

The members or bonds for connecting the box 1 with the conduit 3 aline with the holes $1^a$ of the box and are indicated at 5 and are generally of contour corresponding to the shape of the conduit 3, so as to receive the end portion of the latter. To this end the members 5 are shown as having a bottom $5^a$, sides $5^b$, and grooved portions $5^c$, which latter receive the grooved portions $3^c$ of the conduit, and thus inclose the end of the conduit in the nature of a bond. (See Fig. 2.) The end portion of the conduit may be entered in the member 5 to any desired extent, and the cover 4 of the conduit may be pushed into or through the opening $1^a$ of box 1, whereby the wires contained in the conduit entering the box may be inclosed on all sides adjacent to the box.

The members 5 are shown as detachably connected with box 1, are preferably made of metal of such proportions that the conduit may be placed over the channel of the member and pushed downwardly into place, the sides $5^b$ of the member being adapted to move laterally to permit the entrance of the conduit and then to spring back into position upon the conduit. The shape of the hole $1^a$ is preferably made to correspond to the contour of the member 5, so as to receive the latter snugly, as indicated in Fig. 2. The members 5 at their inner ends are also shown provided with lugs $5^d$, adapted to be bent sidewise against the inner wall of box 1 at the corresponding edges of the holes $1^a$ to afford a smooth surface against which wires or their insulation may be drawn, so that the latter will not be injured. These lugs also serve to assist in keeping the members 5 from being pulled out of the box.

To secure the conduit 3 firmly to the member 5 to keep them from being pulled apart, we have shown the outer ends of said member as provided with prongs $5^e$, that are adapted to pass through slots $3^d$ in the bottom $3^a$ of the conduit and to be bent back in hook-like form, as indicated in Fig. 2. To apply the conduit to the member 5, the prongs 5ᵉ will be bent upwardly or across the channel of the member, and the conduit will be placed over the member with its slot 3ᵈ in line with the prongs and then pushed to place, so that the prongs will pass through the slot, and then the prongs will be bent down to secure the parts 3 and 5 together. One or more prongs 5ᵉ in a member may be used, as desired.

Any suitable means may be provided for securing the members 5 detachably to the box 1. For this purpose we have shown the members 5 as provided with extensions 5ᶠ, having inwardly-bent lugs or toes 5ᵍ, adapted to enter slots 6ᵃ in a plate or disk 6, that is removably held centrally upon the bottom of box 1 by means of a screw 7 or the like. As the members 5 extend in a radial direction, their projections 5ᶠ will extend toward the center of the box, so that the plate or disk 6 can be used for a number of such members by providing a corresponding number of slots 6ᵃ to receive the corresponding lugs 5ᵍ. (See Fig. 1.) From this it will be seen that when the plate 6 is held in place upon the lugs 5ᵍ the members 5 will all be held from outward and inward movement, and any of the members can be removed or attached by properly manipulating plate 6.

The bottom 2 of the box is preferably provided with radial grooves 2ᵃ, that aline with the corresponding holes 1ᵃ, which grooves preferably extend entirely across the bottom of the box, intersecting centrally, so that when an electrical conductor or wire is to be carried straight through the box the conduit 3 can be pushed through the opposed holes 1ᵃ in the box and can lie in the groove 2ᵃ. The grooves 2ᵃ also serve to receive the extensions 5ᶠ of members 5, whereby said extensions are sunk into the bottom 2 to a suitable extent to lie about flush with the inner surface of the bottom, so as not to present sharp edges within the box to be engaged by insulation on wires.

As the members 5 are detachably connected with box 1 and as one or more of such members may be utilized at a time, any suitable means may be provided for closing the holes 1ᵃ that are not in use. Such means may consist of a metal cap 8, stamped and bent to suitable shape, adapted to be pushed through the hole 1ᵃ to close the same and to be readily removed when the member 5 is to be attached to the box at such hole.

By means of our invention the conduit 3 can be readily connected with an outlet-box by slipping the appropriate end of the member 5 into hole 1ᵃ in the box, bending back the lugs 5ᵈ, and securing the member in place, and then pressing the end of the conduit into the member and bending back the prongs 5ᵉ, as before described, and after the wire is laid in the conduit and passed into the box the cover 4 can be slid along the conduit to make a complete closure of the wire. When an additional conduit is to be connected with a box, the plate 6 is merely loosened or removed, the member 5 put in place, and the plate 6 reapplied. As the sides 5ᵇ 5ᶜ of member 5 closely correspond to the sides of the conduit, a tight fit around the adjacent end of the conduit is afforded, and the member 5 thus acts in the nature of a bond to close all joints between the conduit and the box for electric contact.

Various changes may be made in the details shown and described without departing from the spirit of our invention. For instance, instead of using the plate 6 with the screw 7 to hold several extensions 5ᶠ a screw could pass through each extension into the bottom of the box; but by using the plate a single screw only is required, thus saving screw-holes in the bottom of the box and eliminating parts that might cause abrasion of the insulation on wires.

Having now described our invention, what we claim is—

1. An electrical outlet or junction box provided with holes, channel-like members entering said holes to embrace the end portions of correspondingly-shaped conduits, means to detachably receive conduits in said members, and means for detachably connecting said members with said box, said members being provided with prongs bent into connection with a conduit to hold the members and conduits together, substantially as described.

2. An electrical outlet or junction box provided with holes, channel-like members having a bottom and two sides, open opposite the bottom, and opposed grooved portions on said sides, said members entering the holes in the box, and means for connecting said members with said box, said members being provided with prongs bent into connection with a conduit to hold the members and conduits together, substantially as described.

3. An outlet or junction box provided with holes, combined with members entering said holes to connect with conduits, said members having extensions passing into the box along its bottom, and means for detachably connecting said extensions with the bottom of the box, substantially as described.

4. An electrical outlet or junction box provided with holes, and members entering said holes and provided with prongs bent into connection with conduits through slots in said conduits to hold the members and conduits together, substantially as described.

5. An electrical outlet or junction box provided with holes, members entering said holes to receive conduits, said members having extensions passing into the box along its bottom, a plate held on the bottom of the box, and means for detachably connecting said plate with said extensions, substantially as described.

6. An electrical outlet or junction box provided with holes, members entering said holes and provided with extensions having lugs, a plate provided with slots to receive said lugs, and means for holding said plate upon the box, whereby said plate may retain several of said members in position, substantially as described.

7. An electrical outlet or junction box having holes and having intersecting grooves in its bottom alined with said holes, combined with members entering said holes to connect with conduits, said members being provided with extensions that are located in said grooves, and means for holding said members upon the box, substantially as described.

8. A bond-like member for holding a conduit to an outlet or junction box comprising a channel-like piece having a bottom and sides provided with opposed grooves to receive a conduit and provided with lugs adapted to be bent against the inner wall of a junction-box, substantially as described.

9. The combination of a box provided with holes, with a bond-like member having a bottom, and sides provided with grooved portions entering said holes, a conduit entering said member and provided with a slot, said member having a prong passing through said slot, and means for attaching said member to the box, substantially as described.

10. A bond-like member for holding a conduit to an outlet or junction box comprising a channel-like piece having a bottom, and sides provided with grooved portions, said member being provided with an extension adapted to be secured to a junction-box, said member also having a prong adapted to be bent into connection with a conduit through a slot in said conduit to hold the member and conduit together, substantially as described.

11. A bond for connection with a conduit comprising a channel-like piece having a bottom and sides provided with grooved portions and a prong adapted to be bent through a slot in a conduit, substantially as described.

CLARENCE C. SIBLEY.
GEO. A. LUTZ.

Witnesses:
GEO. W. BLUNT,
T. F. BOURNE.